United States Patent Office 3,116,055
Patented Dec. 31, 1963

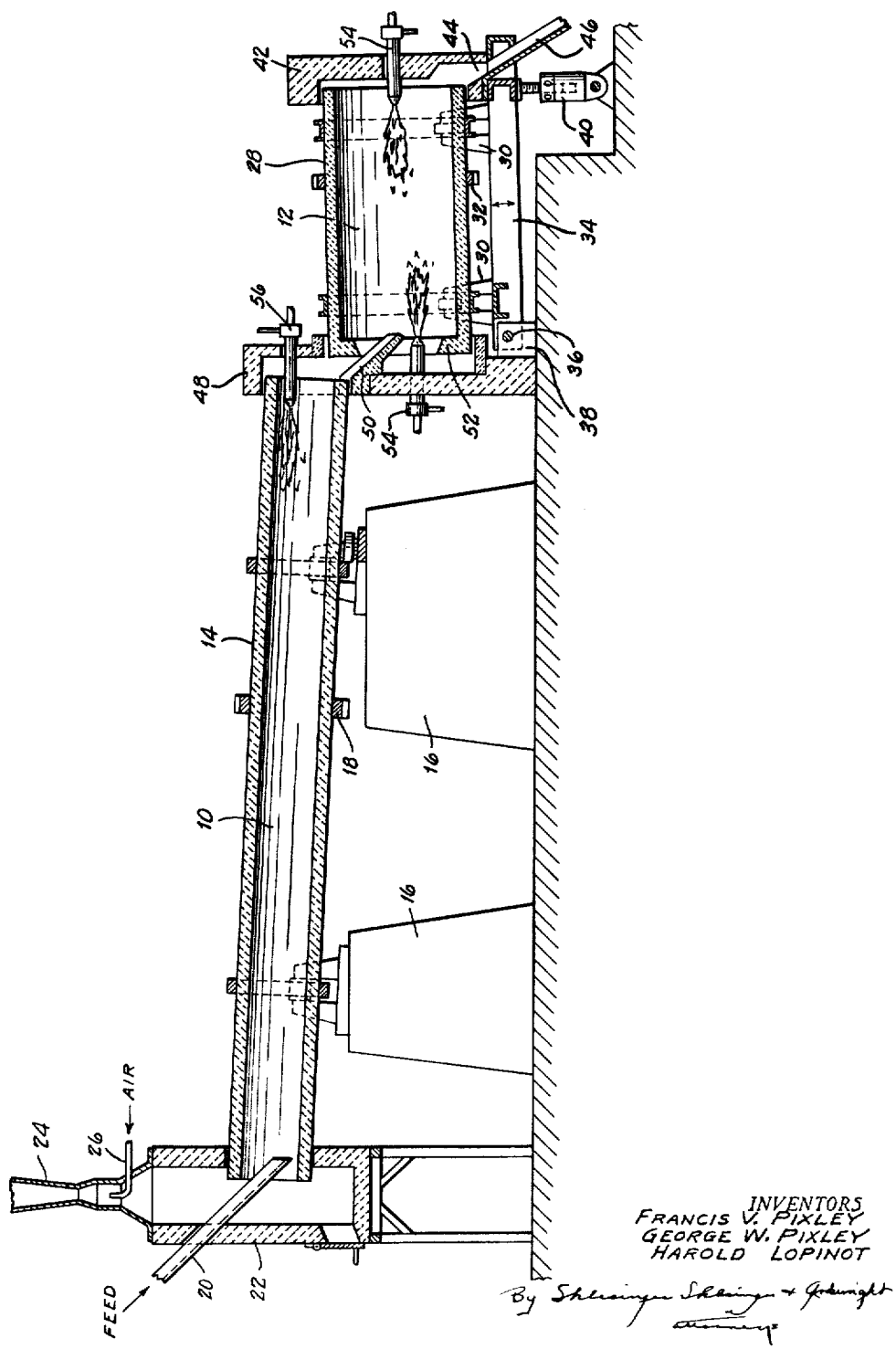

3,116,055
APPARATUS FOR FORMING LIGHTWEIGHT AGGREGATES
Francis V. Pixley, George W. Pixley, and Harold Lopinot, all of Newburgh, N.Y., assignors to Pelm Research and Development Corporation, Newburgh, N.Y., a corporation of New York
Original application Feb. 9, 1959, Ser. No. 792,002, now Patent No. 3,037,940, dated June 5, 1962. Divided and this application Feb. 23, 1962, Ser. No. 175,091
3 Claims. (Cl. 263—32)

This invention relates to apparatus for the formation of aggregates and more particularly to apparatus for the formation of lightweight aggregates through the expansion of raw material particles.

This application is a divisional application from Serial No. 792,002, filed February 9, 1959, for Method for Forming Lightweight Aggregates now issued U.S. Patent 3,037,940 of June 5, 1962.

At the present time there are a number of apparatus employed for forming the aggregates used in making concrete and, in several of these apparatus raw material particles are expanded or "bloated." Of these latter apparatus, one of the most common consists of an inclined rotary kiln through which is passed the raw material particles. The raw material is introduced into the kiln at the upper end thereof and during its passage through the kiln the material is heated by hot gases produced by a burner at the lower, or discharge end. Through the use of such a kiln the raw material particles are gradually brought to the "bloating" temperature, that is, the temperature at which the surfaces of the particles are sealed and the volatile constituents in the particles sublimated.

Associated with the use of the above-described apparatus are several serious disadvantages. The first of these is that the use of such a kiln entails a high fuel cost. This results from the fact that the apparatus does not permit utilization of an efficient heating arrangement. The single burner located at the lower end of the kiln can efficiently heat only a very small portion of the kiln. Furthermore, the relatively short, "bloating" zone limits the amount of raw material that can be processed due to the necessity of retaining each particle in the bloating zone long enough to properly expand the particles. Accordingly, the amount of raw material in the kiln is not sufficient to efficiently absorb the heat and most of the heat passes out the exhaust as waste energy.

Another disadvantage of the above apparatus is that only raw material particles of substantially the same size can only be processed at one time. The reason for this is that the retention time in the "bloating" zone must be set to completely "bloat" the larger particles. Smaller particles, which require less time to "bloat" and which eventually take longer to pass through the kiln, thus receive too much heat and fuse around the larger particles. To produce the required particle size in the finished product such "klinkers" must be ground. Apart from the additional grinding operation such grinding also produces a less desirable open-pored aggregate.

In addition to the above-discussed disadvantages, the apparatus fails to provide sufficient heat control to produce a uniform and properly "bloated" product. As has been pointed out, the single burner at the discharge end gives a proper temperature control for only a very short distance. Further, it has been found that adequate heating throughout the effective length of the inclined kiln can be obtained by raising the temperature in the immediate vicinity of the burner above that required for proper "bloating." The result is that the particles of raw material are each gradually brought up to the "bloating" temperature instead of being quickly brought up to the "bloating" temperature which is the preferred effect.

Further, the limitations of the heating arrangement impose severe limitations on the amount of production which can be obtained through the use of this apparatus. Since the "bloating" zone is very short and the gradual heating of the particles requires a longer period of "soaking" than would otherwise be necessary the particle retention time in the "bloating" area is such that the feed of the material through the kiln is necessarily fixed. Too fast a feed rate will give too short a retention time and too slow a feed rate will give too long a retention time. This fixed rate of feed, which must be low because of the shortness of the "bloating" zone coupled with the low "bloating" percentage of the kiln results in the low production rate associated with this type of kiln.

Our invention has, among its objects, the development of a novel apparatus for carrying out the "bloating" of raw material aggregate particles to the expanded lightweight aggregate form and which will constitute an improvement over previously used apparatus, in that, the disadvantages connected therewith will be obviated and greatly lessened.

More specifically our invention has for an object the development of a new and improved apparatus of expanding row material which is more economical, allows a greater yield, a more uniform product, and provides a greater control over the heating of the particles and gives greater flexibility in the retention time of the particles in the "bloating" zone and more flexibility and control over the size of the particles treated in the apparatus than the previously employed inclined rotary kilns.

*General Description*

Briefly, our improved apparatus contemplates the simultaneous processing of raw material particles of varying size and in passing the particles through a kiln in a manner such that each particle remains within the "bloating" zone for a period of time substantially in proportion to its size and weight, i.e. its density. Furthermore, the heating of the particles is carried out in such a way that the length of the "bloating" zone is effectively increased and the individual particles of raw material are rapidly brought to the proper temperature rather than gradually as is necessitated by the use of the presently used apparatus.

More precisely, the particles of raw material are first pre-heated to drive off the moisture therein and to prepare the particles for "bloating." Thereafter the particles are introduced directly into the "bloating" zone where the relatively large temperature differential between the particles and the "bloating" zone quickly transforms the outside skin of the particles into an elastic impervious state before the volatile constituents of the particles have been sublimated. The quick transformation of the outer skin of the particles to such an impervious state is important in that in such a state the volatile constituents are retained in the interior of the particles so that the percentage of voids created in the particles is higher than that possible with a slower heating time and so that the uniformity of the pore density is reproducible and constant. Exposure of the particles to the temperature of the "bloating" zone is continued for a period of time substantially in accordance with the size and weight of the particles so that each particle is expanded substantially to the same degree. In such a way a distribution of sizes of particles can be introduced into the preheating zone of the kiln and the end product will be different sized expanded particles having substantially the same density. Associated with this apparatus is the effect that the smaller particles do not become super-heated to the point where they coalesce upon the surface of the larger particles and thereby create large particles which must be ground in order to be finally usable in the ultimate concrete product.

The use of the apparatus as herein described presents the following manner of expanding the raw particles. The particles are introduced into the "bloating" zone with the desired temperature differential by effecting the pre-heating step in a chamber separate from that in which the "bloating" is accomplished. Each particle is retained within the "bloating" zone for the proper period of time in accordance with its size and weight, i.e. its density, by variably inhibiting the passage of the particles through the expansion chamber. This latter step may, of course, be carried out in several different ways. This application is concerned with apparatus which simply and satisfactorily agitates the raw material particles so as to set them into continuous and random motion and simultaneously forces the expanded particles, by displacement, upward in an inclined path through the "bloating" zone. This combined action effects the continuous classification of the particles in a downward and rearward direction in which the larger and heavier particles always tend to assume a position further down and backward than the lighter and smaller particles. The total movement of the mass of expanded particles, however, is forward and upward due to the continual feed of more raw material particles into the kiln, which particles serve to limit the extent of possible backward movement of the preceding particles. And the result is to retain the particles in the "bloating" zone substantially in proportion of their size and weight, i.e. their density, the smaller and lighter particles pass through more quickly due to the fact that they are more quickly expanded into the lightweight aggregates, than the larger and heavier particles which require a longer "bloating" retention time. Hence the smaller and lighter particles do not require the longer retention time of the larger and heavier particles all of the particles are expanded to substantially the same degree.

The apparatus comprises, in general, a heating chamber to receive the raw material particles, means for passing the raw material particles through the heating chamber, and means for variably inhibiting the passage of the particles through the heating chamber. Preferably, the apparatus has a separate preheating chamber from which the material is directly introduced into the main heating chamber. The preferred form of the variable inhibiting means comprises means for agitating the particles into a continuous random motion and for simultaneously passing the particles along an upwardly inclined path through the heating chamber.

It will be understood that the foregoing general description and the following detailed description are exemplary and explanatory of the invention but are not restrictive thereof.

The drawing is a longitudinal cross-section taken on the center line of the applicants' preferred form of the apparatus.

*Detailed Description*

As shown in the drawing, our preferred form of the apparatus comprises a two-stage construction so as to provide a pre-heating chamber 10 separate and distinct from the heating chamber 12 in which the "bloating" of the particles takes place. The pre-heating chamber 10 is formed by an open-ended, cylindrical rotary kiln 14 rotatably supported on the foundation blocks 16 with a downward inclination from left to right as viewed in the drawing. As is customary in the art, the kiln 14 is provided with a large gear 18 about its periphery which cooperates with a suitable driving mechanism (not shown) to affect rotation of the kiln.

Raw material particles are fed into the upper end of the pre-heating kiln 14 through a stationary chute 20 from a suitable source of supply (not shown). The chute 20 is mounted within an exhaust chamber 22 having a venturi-shaped exhaust stack 24 at its upper end. Compressed air is exhausted through the throat of the venturi 24 by means of the conduit 26 so as to form, in effect, a jet pump that draws the exhaust gases out of the kilns 14, and 28.

The second-stage kiln 28, forming the "bloating" chamber 12 likewise comprises an open-ended, cylindrical rotary kiln rotatably mounted on the supports 30 and provided with a large gear 32 about its periphery which, in cooperation with the usual driving mechanism (not shown), effects the rotation of the kiln. The inclination of the kiln 28 is opposite to that of the kiln 14 in that the left hand, or inlet end, of the kiln 28 as viewed in the drawing, is lower than the right hand, or discharge end. Control over the angle of inclination is provided by mounting the supports 30 for the kiln 28 on a frame 34 pivotable about the rod 36 in the stationary brackets 38. Adjustment of the angle is made by raising or lowering a jack 40 placed beneath the opposite, free end, of the frame 34.

Both kilns 14 and 28 are lined with refractory material of sufficient thickness to restrict heat transfer and of hardness to resist the abrasion of the particles. In addition, a wall of refractory material 42 is positioned on the frame 34 so as to close off the discharge end of the kiln 28 leaving, however, an opening 44 through which the particles may be discharged down a chute 46. A wall of refractory material 48 is also provided between the kilns 14 and 28 in order to facilitate connection between the two rotary kilns. Because the longitudinal axes of the two kilns are offset from each other the inlet end of the "bloating" kiln 28 lies almost wholly below the discharge end of the pre-heating kiln 14. The wall 48 thus serves to close off the ends of the kilns 14 and 28 which would otherwise remain open thereby presenting escape of the heated air at this point and also serving to direct the exhaust heat from the "bloating" kiln 28 to the pre-heating kiln 14. A spillway 50 of refractory material is mounted on the wall 48 and serves to direct the discharge from the kiln 14 to the kiln 28.

The "bloating" kiln is provided at its lower end with a dam 52 which reduces the open diameter of the kiln 28 at the lower end thereof. This dam 52 is annular in configuration and extends inwardly from the end of the kiln 28 so as to, at all times, act as a container wall for the bed of "bloating" aggregate material. Inasmuch as the purpose of the dam is to prevent escape of the raw material particles from the kiln which would otherwise happen because of the reverse inclination of the kiln 28, the height of the dam is made great enough to always be higher than the level of the discharge end of the kiln regardless of the kiln angle of inclination.

The "bloating" kiln 28 is heated substantially uniformly throughout its entire length by means of oil burners 54 located at both the discharge and inlet ends while the pre-heating kiln 14 is heated by the exhaust gases from kiln 28. In addition a burner 56 may be positioned, as shown in the drawing, to heat the pre-heating kiln 14 in addition to the heat of the exhaust gases.

Each kiln is properly dimensioned to carry out the function assigned to it. The "bloating" kiln 28 is made with a relatively large diameter and short length. The proportions of the kiln are selected so as to expose the greatest amount of raw material to the flame of the burners 54 and the radiating heat of the chamber 12 in accordance with the required retention time to give complete expansion of the raw material particle. In this way the greatest production of material per unit of time is obtained. In the case of the pre-heating kiln 14 the proportions are selected to give a length of travel great enough to satisfactorily absorb the exhaust heat passing through the kiln and a diameter such that the loading of raw material is great enough to cause heat and frictional energy loss to the hot gas flow. The length to diameter ratio is set at the most economical ratio between the two considerations.

Operation of the Kilns

The operation of the above described apparatus is the following:

The particles of the raw material of various sizes are introduced into the pre-heating kiln 14 through the stationary chute 20. After being introduced into the kiln the particles pass downwardly through the kiln as a result of the rotation thereof and the rate of feed of the particles through the kiln is governed by the speed of rotation and inclination of the kiln. If desired, lifters (not shown) may be provided in the pre-heating kiln 14 to help spill the material through the path of the exhaust gases. Due to the small diameter of the relatively great length of the kiln and the loading of the raw material particles in the kiln, each of the particles is thoroughly pre-heated by the escaping exhaust heat from the bloating kiln 28 by the time it reaches the spillway 50 and has also, all of its moisture driven off.

The particles fall directly from the discharge end of the pre-heating kiln 14, down the spillway 50 into the lower inlet end of the "bloating" kiln 28. As the particles of raw material continue to fill up the "bloating" chamber 12 there is formed in the bottom of kiln 28 a bed of pre-heated raw material particles extending from the annular dam 52 to the discharge end of the kiln. The bed is deepest at a point immediately adjacent the dam 52 and gradually tapers to a shallow depth at the discharge end of the kiln 28.

When the particles drop into kiln 28 they are at the relatively low temperature created by the pre-heating chamber while the temperature of the "bloating" chamber 12 is at a relatively high temperature. As a result of the large temperature differential there is a very rapid heating of the particles to a point where the outer surfaces of the particles become elastic and impervious before the volatile constituents can be sublimated. Thereafter, as the particles pass through the chamber 12 the volatile constituents are sublimated thus causing the expansion or bloating of the elastic and softened particles.

The passage of the particles through the kiln 28 is effected despite the inclination of the kiln toward the inlet end. Rotation of the kiln 28 causes the particles to be carried up the side of the kiln, by adherence to the rotating surface, until gravity overcomes such adherence causing them to fall back into the bottom of the kiln. Since the heavy and larger particles fall back into the kiln before the lighter and smaller particles the entire action is, in effect, a tumbling action in which all of the particles are continuously raised to various heights and then permitted to fall back upon the other particles. The net effect is to set the bed of raw material particles into continuous random motion and to displace the lighter and smaller particles from their position in the particle bed with the heavier and larger particles. This then forces the lighter and smaller particles which require less heating time out of the outlet end of the kiln 28 in a shorter time than the larger and heavier particles which are retained in the heating chamber until their density decreases so that they are then forced out the heating chamber by the incoming particles which are of the unexpanded, heavier density type. Such an action continuously classifies the particles according to their density, or their degree of expansion.

The reverse inclination of the kiln 28 appears to cause the particles falling from the side of the kiln to try to assume a position as near the dam 52 as is possible. Since the larger particles fall from the sides of the kiln before the lighter particles these larger particles preempt the available space from the smaller particles because by the time the smaller particles have fallen the larger ones have preceded them. Thus, there is a continual classification in which the bed of the particles is taken up along the sides of the kiln and allowed to fall back with the larger and heavier particles falling first and tending to go back toward the inlet end. The smaller particles, because they are the last to fall are always forced to take a position closest to the discharge end. Since additional particles are continually being fed into the kiln through the spillway 50, all of the particles are gradually forced out the discharge end because the original space occupied by the particles is taken up by the incoming particles which have a higher density while the preceding particles are being carried up the sides of the kiln. However, the smaller particles are forced through the kiln more quickly than the larger, heavier particles because of the tendency of the larger and heavier particles to fall off the wall before the lighter particles and to roll further back toward the inlet end.

It will thus be seen that, unlike the pre-reated kiln 14 in which the rate of feed of material thereto depends on the speed of rotation of the kiln and the inclination of the kiln, the rate of feed in the "bloating" kiln 28 depends only on the rate at which the raw material is being introduced into the kiln. The speed of rotation of kiln 28, therefore, can be set to give the best tumbling action to the particles.

The angle of inclination of the kiln 28 is set to give the proper retention time in the "bloating" zone for the material being processed. It will be appreciated that the retention time in the kiln is governed by the amount of time it takes to build up a bed in the bottom of the "bloating" chamber 12. Once the bed has been built up, the discharge from the kiln is identical with that of the input. Accordingly, if it is desired to change the retention time of the particles in the "bloating" zone the inclination is increased. This is accomplished by raising the outlet end of the kiln 28 by raising the jack 40 so that the kiln is pivoted about pivot 36. This adjustment gives a deeper bed and hence a longer buildup, or retention, time. For a shorter period the inclination of the kiln 28 is lessened with respect to the horizontal plane. It should be noted that such inclination adjustment is permissible only within the restricted range presented by the special arrangement of the length of the kiln 28 with respect to the height of the annular dam 52.

While the invention has been thus described, it will be understood that it is capable of further modifications and this application is intended to cover any variations, uses, or adaptations of the invention following in general, the principles of the invention and including such departures from the present disclosure as come within knowledge or customary practice in the art to which the invention pertains, and as may be applied to the essential features hereinbefore set forth and as fall within the scope of the invention or the limits of the appended claims.

Having thus described our invention what we claim is:

1. Apparatus for expanding expandable material particles comprising preheat and bloating kilns having feed and discharge openings at feed and discharge ends, and having a length and a diameter, said preheat kiln having a substantially greater length and a substantially smaller diameter than said bloating kiln, said preheat kiln being disposed at an inclined angle with respect to the horizontal and sloping downwardly from said feed opening to said discharge opening, and bloating kiln being disposed at an inclined angle with respect to the horizontal and sloping upwardly from said feed opening to said discharge opening, said kilns being of a straight uniform internal diameter throughout their length, means for introducing unexpanded raw material particles into said preheat kiln, means for introducing said preheated particles into said bloating kiln, means for rotating said kilns to move material through said preheat kiln and into and through said bloating kiln, said kilns having their longitudinal axis offset with respect to each other, the feed end of said bloating kiln lying almost wholly below the discharge end of said preheat kiln, a wall member between said kilns closing off the discharge end of said preheat kiln and the feed end of said bloating kiln and having means for feeding the material from said preheat kiln to said bloating kiln, said bloating kiln having an annular dam at its feed end, and a wall member at the discharge end of said bloating kiln closing off said discharge end, discharge means in said wall member, means for heating and said kilns, an exhaust chamber at the feed of said preheat kiln, and means for varying the degree of incline of said bloating kiln including means for elevating the discharge end thereof.

2. Apparatus for expanding expandable material as in claim 1, and wherein said heating means includes a pair of opposed burners in said bloating kiln and a burner in said preheat kiln.

3. Apparatus for expanding expandable material as in claim 1, and wherein said bloating kiln is pivotally mounted at the feed end and has jack means for elevating said discharge end.

References Cited in the file of this patent

UNITED STATES PATENTS

| | | |
|---|---|---|
| 1,546,964 | Blessing | July 21, 1925 |
| 1,947,789 | Miller | Feb. 20, 1934 |
| 2,505,249 | Johnson et al. | Apr. 25, 1950 |
| 2,602,782 | Zoradi | July 8, 1952 |
| 2,674,445 | Diehl | Apr. 6, 1954 |
| 2,694,565 | Sainderichin | Nov. 16, 1954 |
| 2,865,622 | Ross | Dec. 23, 1958 |
| 2,878,004 | Saeman | Mar. 17, 1959 |